(12) United States Patent
Tsukamoto

(10) Patent No.: US 7,707,436 B2
(45) Date of Patent: Apr. 27, 2010

(54) MANAGING LAPTOP POWER BASED ON DISPLAY ANGLE

(75) Inventor: Yasumichi Tsukamoto, Yamato (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 402 days.

(21) Appl. No.: 11/292,661

(22) Filed: Dec. 2, 2005

(65) Prior Publication Data

US 2006/0139326 A1 Jun. 29, 2006

(30) Foreign Application Priority Data

Dec. 2, 2004 (JP) ............................. 2004-349317

(51) Int. Cl.
*G06F 1/00* (2006.01)
(52) U.S. Cl. ........................................ 713/300
(58) Field of Classification Search ............... 713/300
See application file for complete search history.

(56) References Cited

U.S. PATENT DOCUMENTS

| | | | | |
|---|---|---|---|---|
| 6,044,473 A * | 3/2000 | Kim | ........................... | 713/320 |
| 7,133,280 B2 * | 11/2006 | Love | ....................... | 361/679.07 |
| 2003/0112590 A1 * | 6/2003 | Shimano et al. | ............. | 361/683 |
| 2004/0166904 A1 * | 8/2004 | Kuo | ........................... | 455/574 |
| 2005/0010765 A1 * | 1/2005 | Swander et al. | ............. | 713/166 |
| 2006/0114650 A1 * | 6/2006 | Wang et al. | .................. | 361/681 |
| 2006/0217831 A1 * | 9/2006 | Butterworth et al. | ......... | 700/126 |
| 2007/0057127 A1 * | 3/2007 | Schwager et al. | ......... | 248/125.9 |

FOREIGN PATENT DOCUMENTS

| | | |
|---|---|---|
| JP | 03-292520 | 12/1991 |
| JP | 07-028573 | 1/1995 |
| JP | 11-085108 | 3/1999 |
| JP | 11-167432 | 6/1999 |
| JP | H11-296128 | 10/1999 |
| JP | 11338575 A | * 12/1999 |
| JP | 2002-163038 | 6/2002 |
| JP | 2003-345465 | 12/2003 |
| JP | 2004-146036 | 5/2004 |

* cited by examiner

*Primary Examiner*—Thomas Lee
*Assistant Examiner*—Mohammed H Rehman
(74) *Attorney, Agent, or Firm*—Ference & Associates LLC (57) ABSTRACT

A notebook type of computer of one embodiment includes a display unit, a housing to which the display unit is pivotally attached, an angle sensor which detects an opening angle between the display unit and the housing, a sensor driver which A/D converts an output from the angle sensor and passes the result to a power management driver, and an angle comparison module which reads a setting value as to the opening angle and determines whether the opening angle is within a range of a predetermined angle. If the opening angle is within the predetermined range, a user is presumed to be using the notebook computer on a lap and the power management operation is performed per that presumption.

12 Claims, 11 Drawing Sheets

|  | CPU CLOCK | | | VIDEO | |
| --- | --- | --- | --- | --- | --- |
| LAPTOP MODE | HIGH | MEDIUM | LOW | HIGH | LOW |
| USER SETTING |  |  | SELECT |  |  |
| ⋮ | ⋮ | ⋮ | ⋮ | ⋮ | ⋮ |

MANAGING LAPTOP POWER BASED ON DISPLAY ANGLE

This application claims priority from Japanese Patent Application No. 2004-349317, filed Dec. 2, 2004.

BACKGROUND OF THE INVENTION

The present invention relates to power management in an information processing apparatus, and more particularly, to an information processing apparatus that automatically detects that a portable information processing apparatus is in a state of laptop use to perform power management thereto, a power management method of the information processing apparatus, and program for executing the above.

In recent years, high-performance components such as a central processing unit (CPU), a hard disk, a CD-RW and the like are incorporated in a notebook type information processing apparatus. For this reason, a heating value of the notebook type information processing apparatus tends to increase more and more. The generated amount of heat is released to the outside of a housing through a cooling mechanism, such as a fan, a heat sink or the like in order to suppress a housing temperature to be less than or equal to a predetermined temperature. Nonetheless, in a portable information processing apparatus such as, in particular, a notebook type personal computer for example, since a bottom of the housing does not have an enough thermal diffusion efficiency, it tends to get hotter compared with other portions.

Moreover, as the downsizing of the information processing apparatus has been achieved, the information processing apparatus has been increasingly brought with a user and used on a user's lap in many cases. When the user uses the information processing apparatus on the lap, if the CPU or the like is operated at full power, the bottom of the housing gets hotter, and it is assumed, in some cases, to provide discomfort to the user. Accordingly, it has been required to detect in what kind of environment the information processing apparatus is used by the user and to perform the power management processing based on the result.

Until now, various power management methods have been proposed. For example, in JP11-296128A (Patent Document 1), there is provided a disclosure of a technique by which a trigger for reducing a frequency of a video clock is detected in association with a kind of an application, the frequency of the video clock is subsequently reduced to a predetermined frequency during a vertical retrace line of the display unit using the video clock, and the frequency is kept until the user changes the application.

Moreover, in JP2003-345465A (Patent Document 2), there is provided a disclosure of a technique by which a sensor arranged at a bottom of a laptop computer detects a temperature at the bottom of the housing of the laptop computer, and a signal for starting an auxiliary cooling action for reducing the temperature of the housing is generated. According to this technique, a temperature at a position of the worst thermal diffusion efficiency caused by a touch with the laptop computer is detected to adjust the power consumption of the laptop computer. According to this technique, however, the power consumption control is not initiated until the temperature is increased, thereby leading the user to receive a thermal stimulation from the bottom at that moment.

Furthermore, as a technique of feeding back a detected vibration result to a control of the information processing apparatus, for example in JP2004-146036A (Patent Document 3), there is provided a disclosure of a computer system for processing of evacuating a magnetic head by employing a sensor for detecting environment changes of a magnetic disk unit to predict a physical shock with reference to past records.

These systems are configured to reduce the temperature of the housing by either reducing the video clock rate according to a type of software product currently used, or directly measuring the temperature of the bottom of the housing to initiate the auxiliary cooling action. There is also provided a disclosure of a technique for detecting a vibration provided to the computer system to execute the processing based on the past records. Moreover, a method and a system for controlling the temperature are disclosed in JP2002-163038A (Patent Document 4). Also in this case, the computer is controlled by detecting the temperature, and a relative relationship between the user and the information processing apparatus is not taken into consideration. There is provided a disclosure of the techniques for reducing the temperature of the housing and detecting the vibration to be used for the control, but there is not provided a disclosure of all the techniques for determining the relative relationship between the information processing apparatus and the user from an ergonomic viewpoint, and performing a power management in response to the environments and arrangements under which the user uses the information processing apparatus.

[Patent Document 1] Japanese Unexamined Patent Publication (Kokai) No. H11-296128

[Patent Document 2] Japanese Unexamined Patent Publication (Kokai) No. 2003-345465

[Patent Document 3] Japanese Unexamined Patent Publication (Kokai) No. 2004-146036

[Patent Document 4] Japanese Unexamined Patent Publication (Kokai) No. 2002-163038

SUMMARY OF THE INVENTION

Embodiments herein described provide a technique of detecting a relative arrangement between a user and an information processing apparatus to thereby feed back the result to power management. That is to say, the embodiments provide an information processing apparatus for performing power management, after detecting that a user is using the information processing apparatus on a lap and thereby determining laptop use, a power management method, and program for performing the above.

As a result of earnest study, the present inventor has found out that, when a user uses an information processing apparatus on a lap, an opening angle of a display unit has a significant difference as compared with a case where a user uses the information processing apparatus under a desktop environment. In addition, when used on the lap, the information processing apparatus provides a vibration pattern differing from the case where used on a desktop. Thus, according to certain embodiments of the present invention, the information processing apparatus detects the vibration and the opening angle of the display unit, and determines in what a relative position the information processing apparatus is to the user. The information processing apparatus is provided with an angle sensor, or angle-sensing circuitry, which detects the opening angle between the housing and the display unit. Although not required to practice the invention, the detected opening angle is preferably compared with an angle range that is set based on an ergonomic viewpoint, and it is determined whether the information processing apparatus is being used on the lap. As a result of this determination, if the information processing apparatus is determined to be operated on the user's lap, the information processing apparatus is switched to an operational mode for reducing at least a clock rate of a CPU, namely so-called the operational mode in a laptop mode. In the laptop mode, for the purposes of example and not limitation, brightness and a video clock rate of the display unit can also be reduced at the same time.

According to the other embodiment of the present invention, the vibration experienced by the information processing apparatus is detected by the acceleration sensor incorporated into the information processing apparatus. An output value of the acceleration sensor is A/D converted and stored in a memory over a predetermined period including a determination time of the opening angle. A detection of the relative position of the information processing apparatus used on the lap to the user is firstly performed by detecting the opening angle of the display unit. The display unit, if determined to be in a predetermined opening angle to the housing, reads acceleration data within a predetermined period stored in the memory, and determines the output value of the acceleration sensor during a period T1 before the determination time of the opening angle. When the output value of the acceleration sensor during the period T1 has a non-zero value, the operational mode of the information processing apparatus is switched to the laptop mode.

Moreover, according to still other embodiment of the present invention, after lapse of the determination time of the opening angle, the use of the laptop mode is determined by further using the output value of the acceleration sensor during a period of T2. According to this embodiment, the opening angle of the display unit and the output value of the acceleration sensor are used, thereby making it possible to provide further accurate power management in the laptop mode.

Accordingly, the information processing apparatus can detect the relative position to the user and the vibration, and determine that the user is using the information processing apparatus on the lap. For this reason, even when the user uses the information processing apparatus on the lap for a long time, the effect of heat provided to the user through the housing can be reduced, and at the same time, hours of use of a secondary battery can automatically be extended, allowing a more comfortable mobile environment to the user.

BRIEF DESCRIPTION OF THE DRAWINGS

Some of the purposes of the invention having been stated, others will appear as the description proceeds, when taken in connection with the accompanying drawings, in which:

FIG. 4, consisting of FIG. 4A and FIG. 4B, is a view showing the difference between two postures of a user and corresponding detection by an angle sensor according to an embodiment of the present invention wherein a laptop mode is detected by such angle sensor;

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
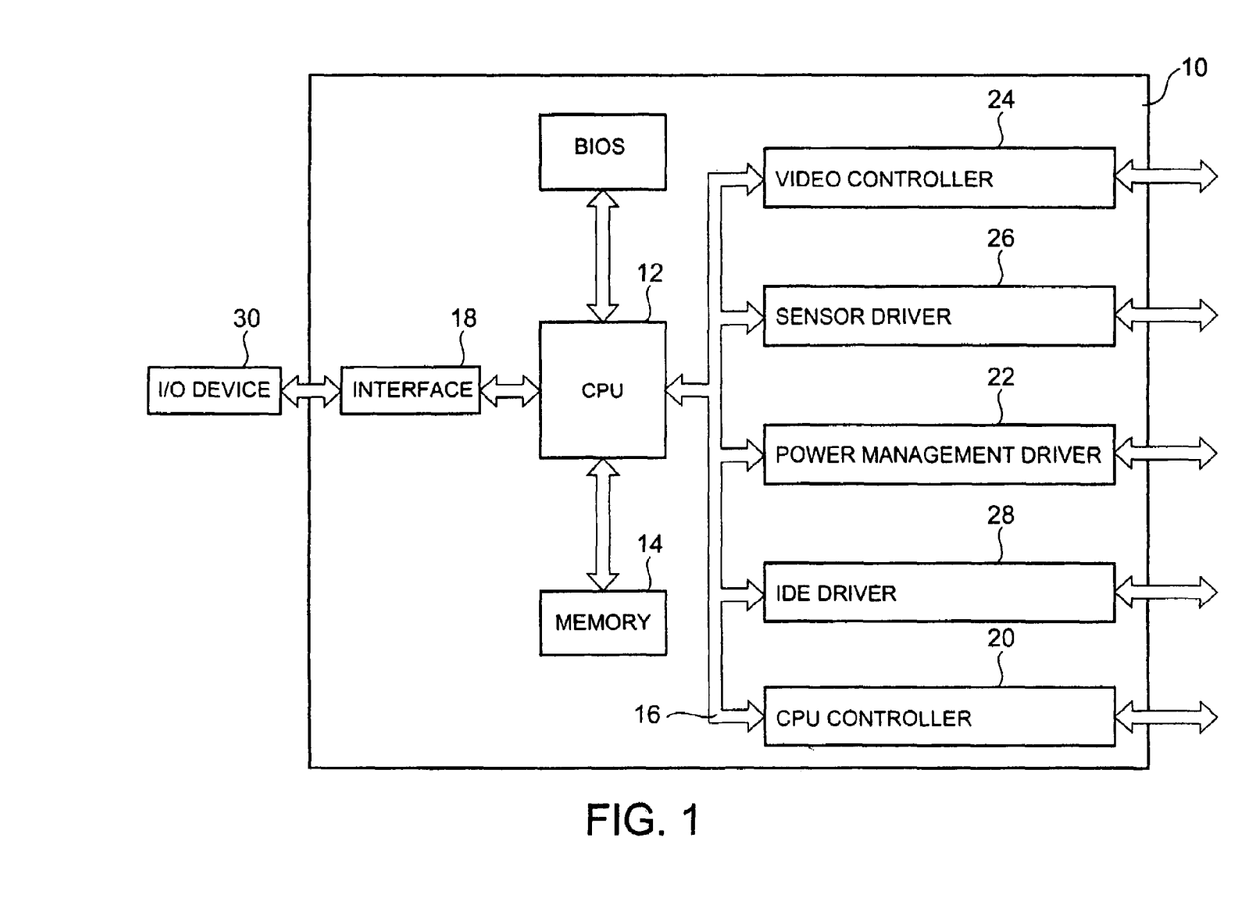
FIG. 1 is a schematic block diagram of an exemplary information processing apparatus according to the present invention.

Referring now more particularly to the accompanying drawings, in which like numerals indicate like elements or steps throughout the several views, FIG. 1 is a schematic block diagram of an information processing apparatus in the present invention. An information processing apparatus 10 shown in FIG. 1 includes a central processing unit (CPU) 12, a BIOS stored in a ROM or the like, and a memory 14 such as a RAM for allowing an access from the CPU 12. Upon booting up the information processing apparatus 10, the CPU 12 reads information from the BIOS and sets up input and output systems. The information processing apparatus 10 further includes a CPU controller 20, a power management driver 22, a video controller 24, and a sensor driver 26, which are interconnected therein with an internal bus 16.

The power management driver 22 performs a power save mode processing, such as sleep and hibernation of the information processing apparatus 10, and a power management such as a clock control of the CPU, a video clock management or the like. The CPU controller 20 receives a command from the power management driver 22, generates CPU clock rates corresponding to various modes, for example various clock rates from a basic clock rate by changing a setting of a frequency divider circuit, and drives the CPU at a preset clock rate. The video controller 24 controls brightness of the display unit such as a liquid crystal display, and a display of the clock rate or the like. The sensor driver 26 A/D converts an output from each sensor, sends the output to the power management driver 22, and controls a driving power of the information processing apparatus based on the output of each sensor. Meanwhile, the power management driver 22 controls writing/reading of data to/from a hard disk via an IDE driver 28, and also controls evacuation processing of a magnetic head. Further, an I/O device 30 such as a keyboard, a mouse, a touch-pad or the like is connected to the information processing apparatus 10 through an appropriate interface 18, allowing the user to input/output data therethrough. Additionally, an embedded controller that is not shown is incorporated in the information processing apparatus 16 other than the CPU 12 to control the cooling of the information processing apparatus 10 or the like.

Figure 2:
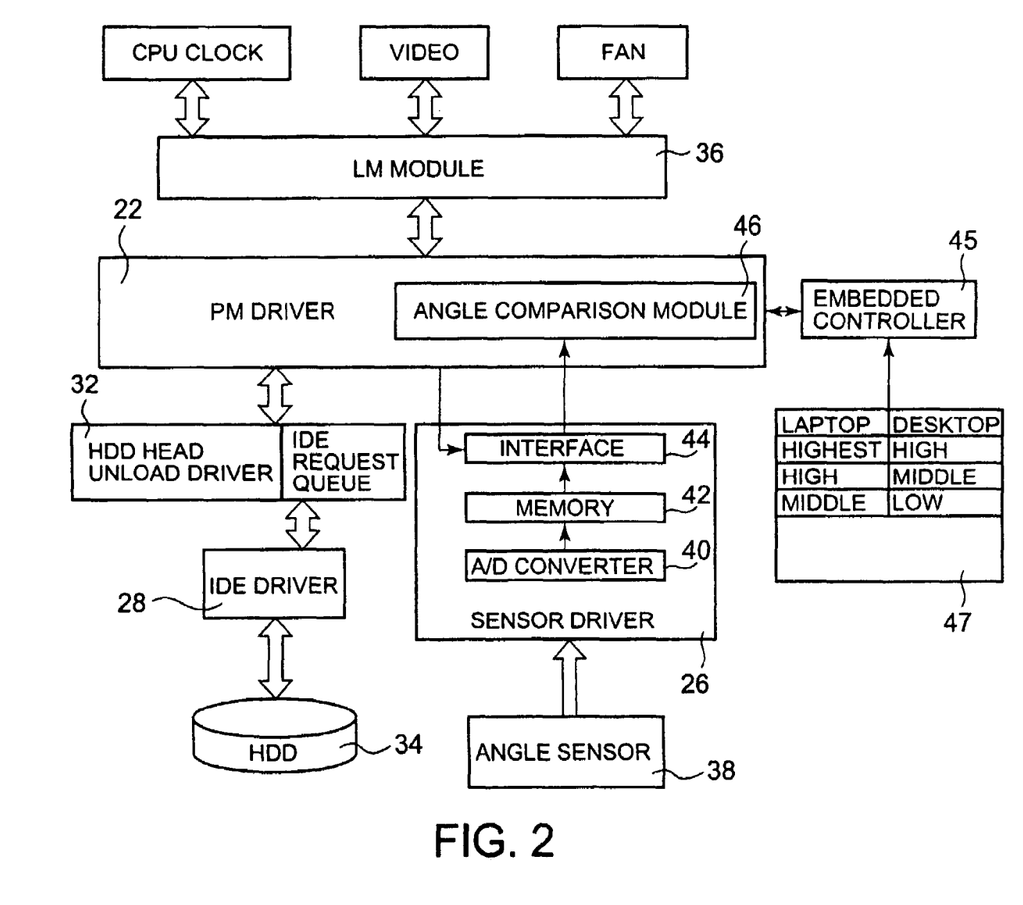
FIG. 2 is a view showing in detail a power management driver and other drivers shown in FIG. 1.

FIG. 2 is a view showing in detail the power management driver 22 and other drivers shown in FIG. 1. The power management (PM) driver 22 in the present invention controls a whole power management, and the PM driver 22, while further controlling a head of a hard disk 34 through a hard disk head unload driver 32, controls read/write controls through the IDE driver 28. In addition to that, the PM driver 22 receives a sensor output, at least an output of the angle sensor 38, from the sensor driver 26, determines an angle between the display unit and the housing, calls a laptop mode control module (hereinafter, referred to as "LM module") 36 in response to the determination, and sets a CPU clock mode, a video clock mode, a rotational frequency or the like.

The sensor driver 26 includes an A/D converter 40 for A/D converting the output of the angle sensor 38, a memory 42 for storing A/D converted acceleration data for a certain period from an acceleration sensor that is not shown and A/D converted angle data, and an interface 44 for passing the A/D converted angle data to the PM driver 22. From the moment that the power of the information processing apparatus is turned on, the angle sensor 38 and the acceleration sensor that is not shown send output value to the sensor driver 26 continuously.

The angle data from the angle sensor 38 is A/D converted with, for example an 8-bit resolution, and is stored in the memory 42 as 180/256 angular resolution data. The angle data stored in the memory 42 is passed to the PM driver 22 for every predetermined sampling period. The passed angle data is inputted into an angle comparison module 46 to be compared with an opening angle range of the display unit to the housing corresponding to the laptop mode stored in an appropriate storing area in the angle comparison module 46. As a result of the comparison, if the opening angle is within the angle range of the laptop mode, the PM driver 22 calls the LM module 36 to make it read a value of the look-up table that stores a power management control value in the laptop mode, and controls the CPU clock mode and the video clock mode to the CPU controller 20 and the video controller 24 through the LM module 36, respectively. Moreover, the PM driver 22 instructs an Embedded Controller 45 for setting up the fan rotation speed or the like to switch the operational mode from the previous operational mode to the laptop mode. The Embedded Controller 45 selects and reads a thermal action table for roll control stored in a ROM or the like from a table for desktop mode or a table for the laptops mode, and executes a control of the fan rotation speed according to a mode specified by the PM driver 22. A thermal action table 47 included in the Embedded Controller 45 is shown in FIG. 2, and fan rotation speed directive commands for respective laptop mode and desktop mode are listed. When the information processing apparatus 10 is used on the lap, a distance from a user's face becomes far in the most cases as also shown in FIG. 4 that will be described below. For this reason, in the laptop mode, when power saving is not taken into determination, a setting for increasing the fan rotation speed more than that in the desktop mode may be employed.

Further, according to the other embodiment of the present invention, the PM driver 22 monitors the output value of the acceleration sensor of the memory 42 in synchronization with a sampling period, and determines whether the acceleration data has a non-zero value within a period for about several seconds prior to that time. As a result of the determination, even when the opening angle of the display unit is within a predetermined range, if the value of the acceleration data for over the past several seconds is a zero value, the PM driver 22 continues the same operation as the previous operational mode, instead of instructing the laptop mode. Further, according to the other embodiment of the present invention, when the information processing apparatus 10 is docked to a docking station, LID_Angle described later extends even in the desktop mode, that is to say, a case where the opening angle is increased can also be assumed. In order to respond to this, the PM driver 22 monitors the value of the acceleration sensor stored in the memory 42 for over several seconds after the determination. If the value of the acceleration sensor for several seconds after determination is not a non-zero value, the laptop mode is set. If the value of the acceleration sensor is a non-zero value, even when the value of the opening angle is within the range of the laptop mode, the PM driver 22 determines that it is in a state of docking to the docking station, and maintains previous operation. Moreover, according to still other embodiment of the present invention, the information processing apparatus 10 can also make the laptop mode not to boot up irrespective of the value of LID_Angle, when the information processing apparatus 10 is detected to be docked at the time of boot-up by setting a power line or monitoring a signal from a connector for docking.

Figure 3:
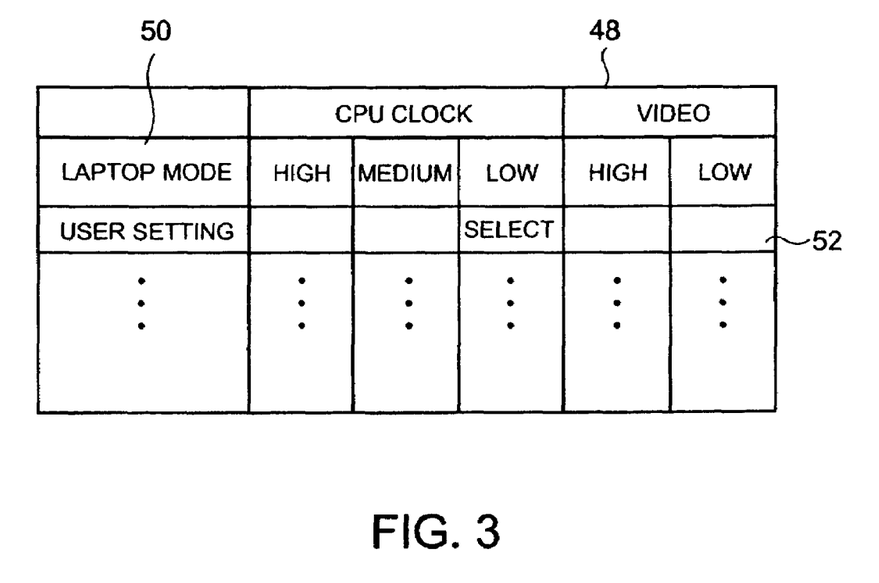
FIG. 3 is a view showing an embodiment of a look-up table which can be used in the embodiments of the present invention.

FIG. 3 is a view showing the embodiment of a look-up table 48 that can be used in the present invention. According to a specific embodiment in the present invention, the look-up table 48 shown in FIG. 3 can be stored in a memory area that the PM driver 22 controls. Meanwhile, according to the other embodiment of the present invention, the look-up table 48 can also be stored in a memory area that the LM module 36 controls. The look-up table 48 shown in FIG. 3 includes a code field 50 for storing control values such as a CPU clock, a video clock, a fan speed or the like, and a user setting description field 52 to which writing is permitted through a graphic user interface (GUI) by the user. When the PM driver 22 instructs that the mode should be in the laptop mode, the PM driver 22 or the LM module 36 reads a control value corresponding to a field specified in the user setting description field 52, for example a field specified by "select" from each code field 50, and issues an instruction to corresponding operational means in order to change the CPU clock mode, the video clock mode or the like.

Figure 4A:
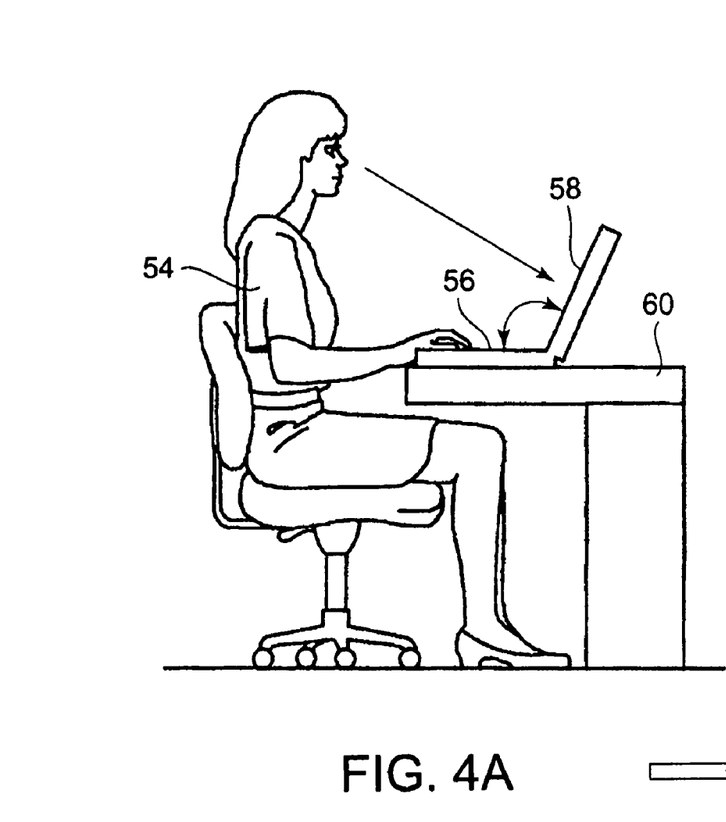
Figure 4B:
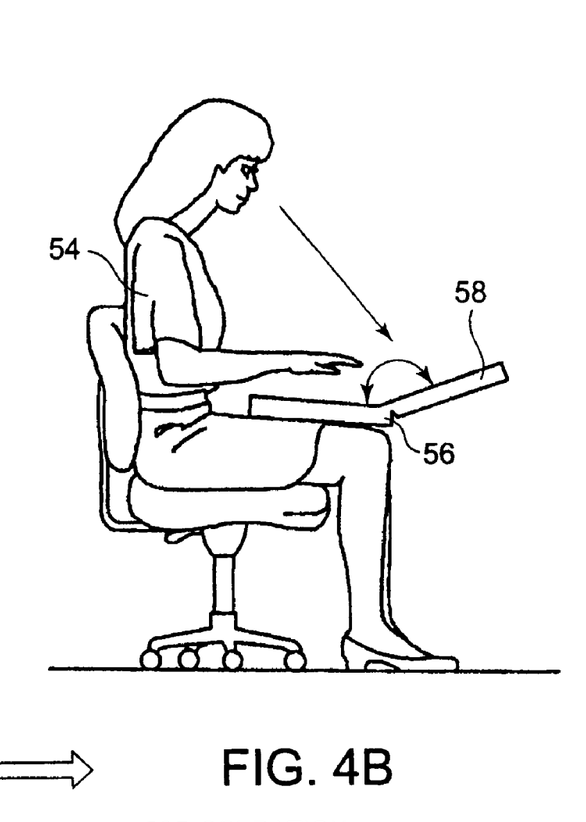

FIG. 4 is a view showing a difference of postures of the user when the laptop mode is detected by the angle sensor in the present invention. FIG. 4A is a view showing the user's posture when the information processing apparatus is operated on the desktop, and FIG. 4B is a view showing the user's posture when the information processing apparatus is operated on the lap. A user 54 casts eyes at a display unit 58 such as a liquid crystal display of the housing 56 in the information processing apparatus at almost right-angle to the direction of the display unit 58. As shown in FIG. 4A, when the information processing apparatus is operated on the desktop, a position of the display unit 58 is raised by a height of a desk 60. As a result of this, it can be understood that the opening angle of the display unit 58 to the housing 56 is decreased as compared with the case of operating the information processing apparatus on the lap as shown in FIG. 4B.

Figure 5:
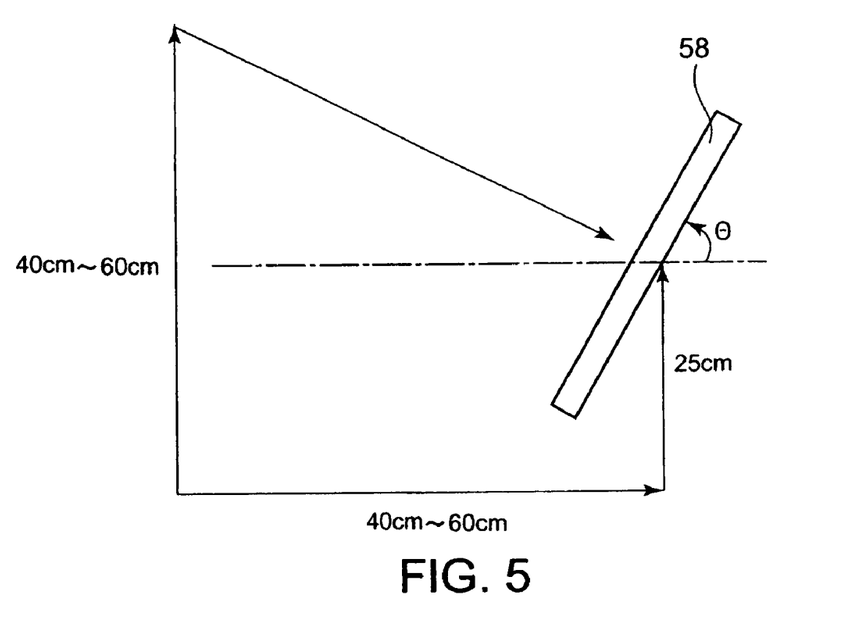
FIG. 5 is a view showing a model for calculating a difference of opening angles of a display unit when the information processing apparatus is operated on a desktop, by using a relationship between the user and the information processing apparatuses shown in FIG. 4.

In FIG. 5, there is provided an indication of a model for calculating differences among the opening angles of the display unit when the information processing apparatus is operated on the desktop, by using a relationship between the user and the information processing apparatuses shown in FIG. 4. In FIG. 5, when the position of a user's elbow is used as a base, the display unit 58 is arranged at approximately right angle to the direction of a user. In an ordinary use, a chair is set so that a height of a desk may be almost the same as that of the elbow. Meanwhile, a height from the user's elbow to the user's eyes is approximately 40 to 60 cm, and in addition, a height of the display unit 58 from the user's thigh is about 25 cm. When the angle in this case is calculated using a Japanese standard physique, $\theta=58°$ is given when the angle is mostly opened, and $\theta=68°$ is given when the angle is least opened.

Figure 6:
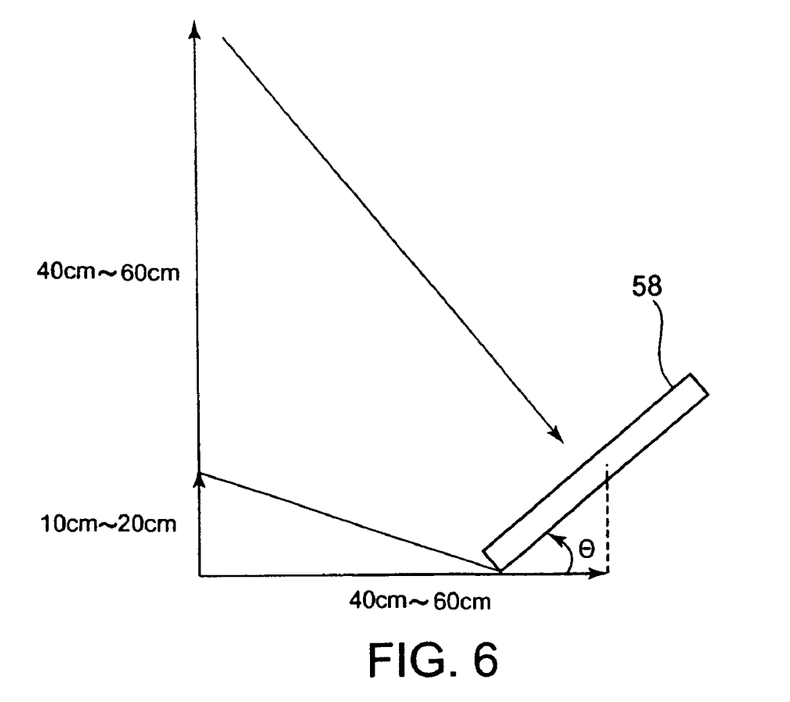
FIG. 6 is a view showing a model for calculating the opening angle of the display unit and its range when the user is operating the information processing apparatus on a lap.

In FIG. 6, there is provided an indication of a model for calculating the opening angle of the display unit 58 and its range when the user is operating the information processing apparatus on the lap. When the information processing apparatus is operated on the lap, the display unit 58 is arranged below the elbow by about 10 cm to 20 cm from the elbow to the thigh. Meanwhile, a distance from an elbow position to a patella is almost constant. As a result of this, the use's line of sight to look down the display unit has a steep angle, and in order to compensate this angle, the opening angle of the display unit increases. In the case shown in FIG. 6, $\theta=37°$ can be obtained when the opening angle is the smallest, and $\theta=5°$ ca be obtained when the opening angle is the largest. That is to say, it has been found out that the desktop use and the laptop use could be determined using the opening angle of the display unit from an ergonomic consideration.

According to the present invention, if a value of a range where these values do not overlap is set as a default setting value, more specifically, if $\theta=65\pm10°$ in the desktop mode and $\theta=20\pm15°$ in the laptop mode are set, it is possible to distinguish the laptop mode from the existing mode. Additionally, it is possible to assume the case where these values may not be within the default values according to preferences or physical features for every user. For this reason, when the program according to the present invention is installed as a utility software product for the sensor driver, the graphical user interface (GUI) for specifying an increasing and decreasing value $\theta'$ set by the user to a default range can be displayed, thereby making it possible to display the laptop mode matching the user. The GUI will be explained below in more details.

Figure 7:
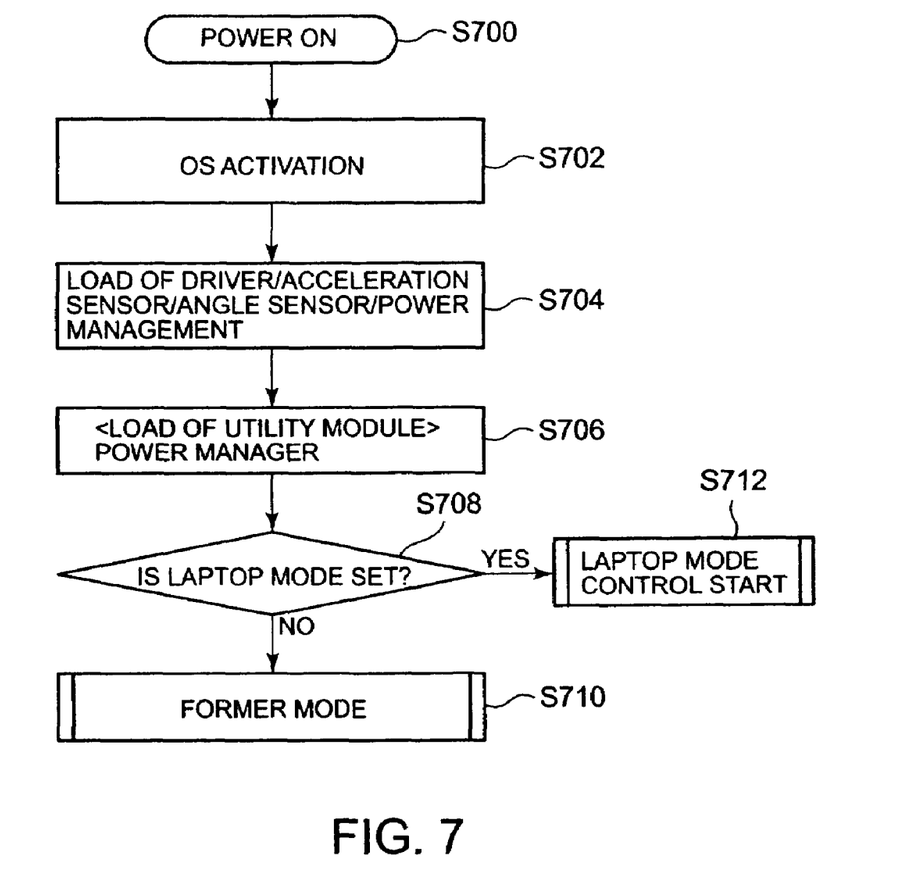
FIG. 7 is a view showing a flow chart when the power management method according to the present invention is started.

FIG. 7 is a view showing a flow chart when the power management method according to the present invention is started. In the power management method according to the present invention, when the power of the information processing apparatus is turned on at Step S700, a BIOS boot-up and an OS boot-up are executed at Step S702. Subsequently, at Step S704, loading of various kinds of drivers is executed, and at this moment, the sensor driver, a power control driver and the like are read. At Step S706, the utility software product for performing the setting of respective driver software products that are read or the like is read, and the power control is performed according to various kinds of setting.

Further, at Step S708, the PM driver determines whether the driver is set in the laptop mode, and if the laptop mode is set, namely in the case of "yes", the power management processing in the laptop mode is started at Step S712. Meanwhile, if determined that the laptop mode is not set, namely in the case of "no", the power control based on the existing mode is executed at Step S710. Furthermore, according to the other embodiment of the present invention, prior to Step S708, a determination of whether the information processing apparatus 10 is docked may be made by setting the power line and monitoring the signal from a connector for docking. When there is a signal indicating that the information processing apparatus 10 is docked to the docking station, a step for bypassing Step S708 and branching to Step S710 may also be provided.

Figure 8:
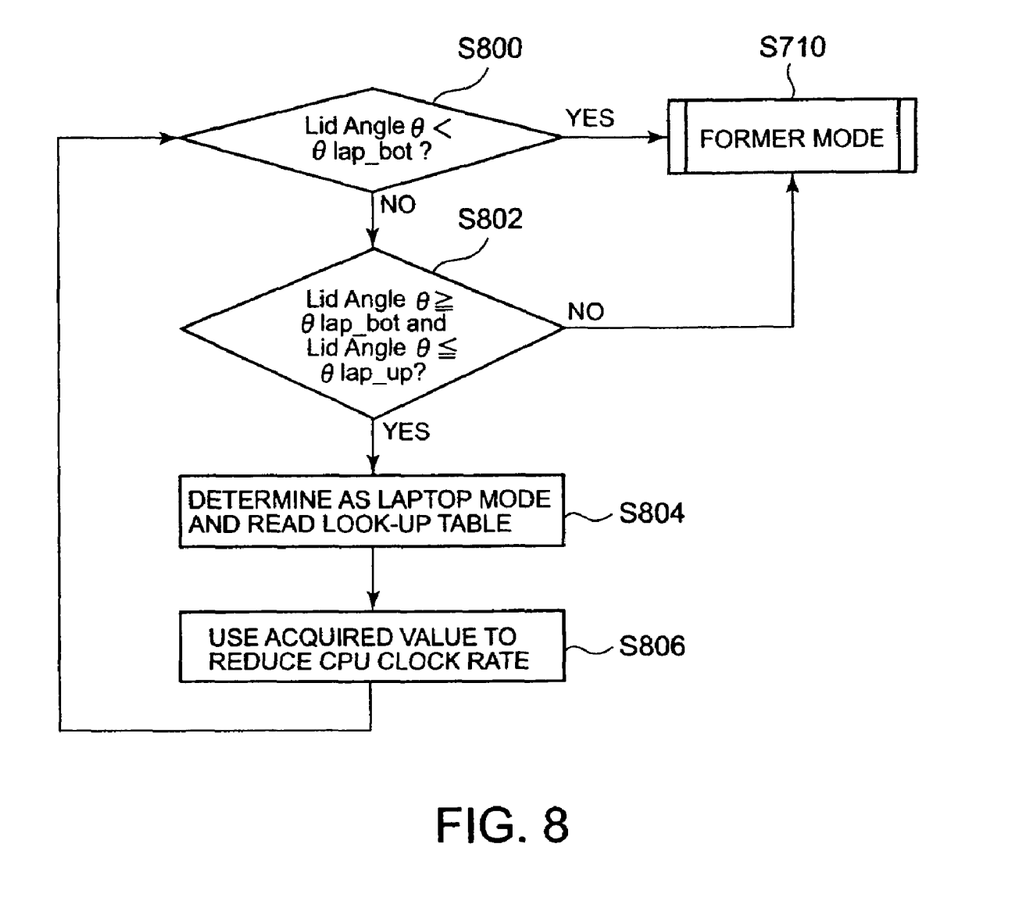
FIG. 8 is a flow chart of the most fundamental processing for switching an operational mode to the laptop mode at Step S712 shown in FIG. 7 according to the present invention.

FIG. 8 is a flow chart of the most fundamental processing for detecting the laptop mode at Step S712 according to the present invention. When the laptop mode starts up at Step S712, it is determined at Step S800 whether the opening angle LidAngle$\theta$ of the display unit is smaller than the minimum angle to be determined as laptop mode $\theta$lap_bot. Now, $\theta$lap_bot is defined as $\theta$lap_bot=$180°-\theta$. Meanwhile, regarding $\theta$, if the opening angle is determined to be less than the laptop mode (LidAngle$\theta$<$\theta$lap_bot) at Step S800 in FIGS. 5 and 6, since it is not the laptop mode, the procedure jumps to Step S710 to execute the former mode.

At Step S800, if the opening angle is determined not to be less than the laptop mode (LidAngle$\theta$<$\theta$lap_bot), it is then determined at Step S802 whether LidAngle$\theta$ is equal to or more than $\theta$lap_bot (LidAngle$\theta \geq \theta$lap_bot) and is equal to or less than $\theta$lap_up, that is the maximum angle of the laptop mode, namely, LidAngle$\theta \leq \theta$lap_up. At this moment, $\theta$lap_up=$180°-\theta$. On determination at Step S802, if LidAngle$\theta$ is determined to be equal to or larger than $\theta$lap_bot, and equal to or less than $\theta$lap_up, namely in the case of "yes", the PM driver determines at Step S804 that the power control should be changed to the laptop mode, makes the power management control value set by the user to be read, and instructs each driver to perform the power control in the laptop mode. Subsequently, after the CPU clock rate or the like is reduced at Step S806, the procedure is returned to Step S800, and the processing of Step S800 through Step S806 is repeated until the angle of the display unit becomes out of range of the laptop mode. Meanwhile, on processing at Step S802, if LidAngle$\theta$ is determined to be larger than $\theta$lap_up, namely in the case of "no", since the user may be operating the information processing apparatus in a special operating form where the user is operating the information processing apparatus at an angle larger than the operational angle of the laptop mode, the processing is set to be in the existing mode of Step S710.

Figure 9:
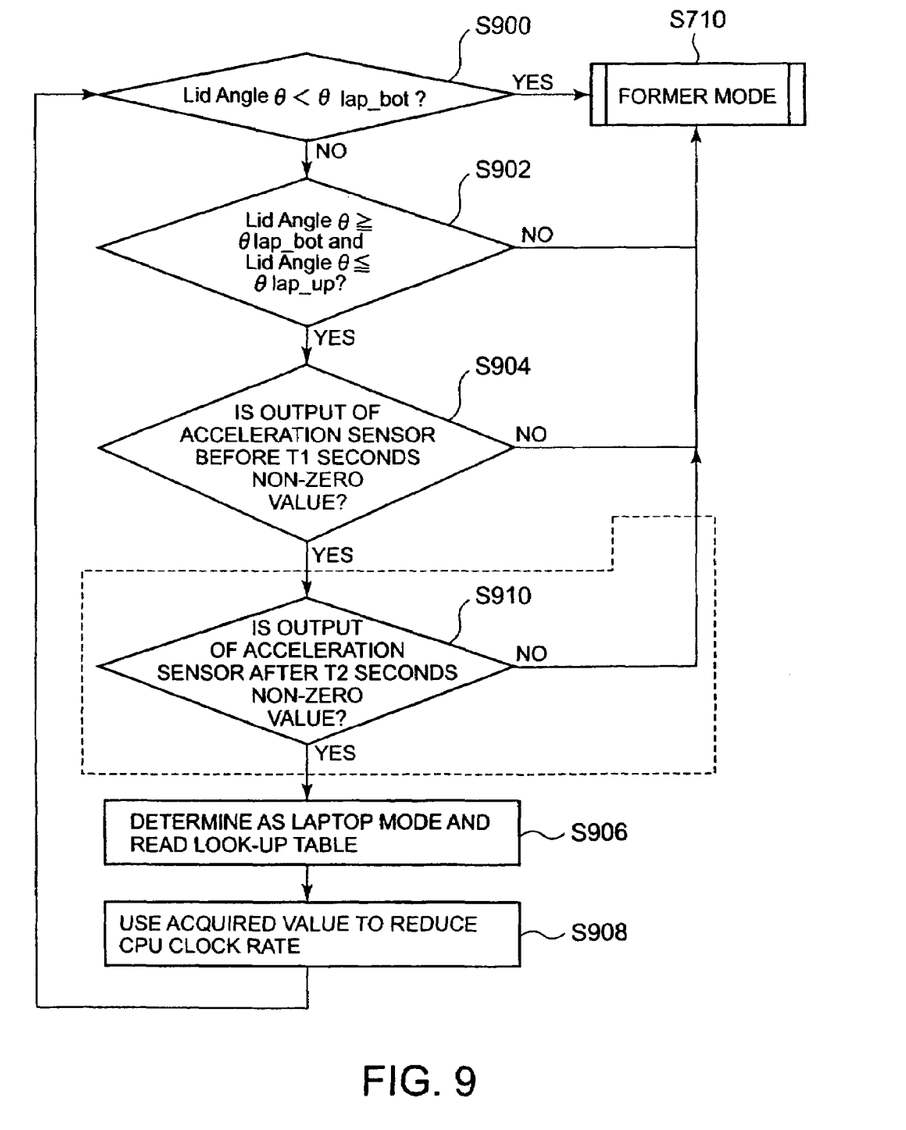
FIG. 9 is a view showing another embodiment of the processing for switching to the laptop mode in an embodiment of the present invention.

FIG. 9 is a view showing the other embodiment in processing the laptop mode in the present invention. The embodiment shown in FIG. 9 differs from the embodiment shown in FIG. 8, in the point of monitoring the output of the acceleration sensor at Step S904 for T seconds before and after the determination time of the opening angle, namely for approximately several seconds (assuming that $T_1$ seconds are the time before the determination time and that $T_2$ seconds are the time after the determination time, T seconds can be defined as T=T1+T2) to thereby determine the laptop mode but the former is identical to the latter in other points. Therefore, other processing steps will not be explained in particular. On the determination at Step S902, if the opening angle LidAngle$\theta$ is determined to be within the angle of the display unit in the laptop mode, the PM driver, at Step S904, reads the output of the acceleration sensor for $T_1$ seconds before the determination time. The acceleration sensor in the present invention is configured in such a way that the output for at least several seconds is stored, and the output of the acceleration sensor can be read in synchronization with the sampling period of the opening angle.

As a result of obtaining the value of the acceleration sensor, if the output of the acceleration sensor for at least several seconds before the determination time has a non-zero value, namely in the case of "yes", the probability of the laptop use is highly probable. Therefore, the procedure goes to Step S906 to determine the laptop mode, and the LM module is called up to read the value of the look-up table. Subsequently, the procedure goes to Step S908 to reduce the CPU clock rate or the like by using the read value. Meanwhile, at Step S904, if the output of the acceleration sensor for $T_1$ seconds before the determination time has a zero value, namely in the case of "no", the mode is determined to be in the non-operational state, and in the operational form in which the opening angle of the display unit is only large, and the processing is returned to the existing mode at Step S710.

Sampling of the acceleration sensor is performed at the cycle of about several tens of milliseconds, and for this reason, a plurality of data exist for several seconds. According to the present invention, if at least one value among the outputs of the acceleration sensor for several seconds is a non-zero value, the output value of the acceleration sensor can be determined to be moving, and if an average value is calculated from the whole data, and the resultant average value exceeds a predetermined threshold in the number of predetermined times, the output value of the acceleration sensor can also be determined not to be moving.

According to the embodiment shown in FIG. 9, with the opening angle of the display unit, the vibration of the information processing apparatus in the laptop use is detected, thereby making it possible to determine the laptop mode more accurately. For this reason, according to the present invention, it is possible to operate the information processing apparatus in a low power mode upon starting up in the laptop mode by using the opening angle of the display unit, thereby making it possible to reduce a burden on the user in advance. Moreover, according to the other embodiment of the present invention, Step S910 shown with the broken line can be added after the determination at Step S904 in FIG. 9, and can be continued for $T_2$ seconds (for several seconds) after monitoring the opening angle of the display unit. In this case, if the output value of the acceleration sensor for the period of $T_1$ is a non-zero value and the output of the acceleration sensor for the period of $T_2$ is also a non-zero value, the mode is determined to be the laptop mode, thereby making it possible to mount the operational mode so as to change from the previous mode.

Figure 10:
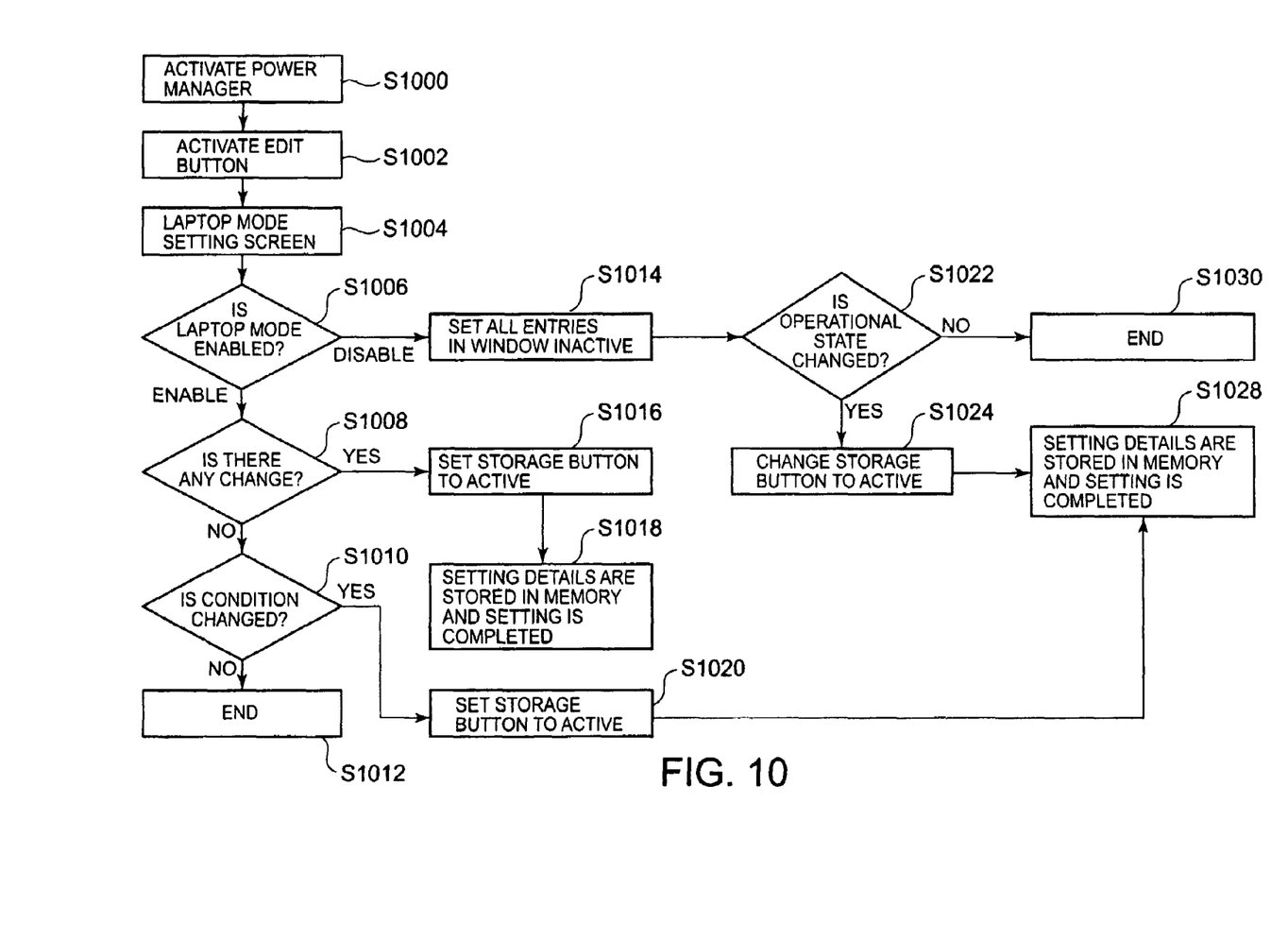
FIG. 10 is a view showing a flow chart when the setting of the laptop mode is executed in an embodiment of the present invention.

FIG. 10 is a flow chart when the setting of the laptop mode in the present invention is made using GUI that is displayed to the user through the display unit. The setting of the laptop mode in the present invention can be made according to an indication of the graphical user interface (GUI) displayed on, for example a power manager window. At Step S1000, if the user clicks on a power manager icon, an input display will be displayed on the display unit. On the input indication, the data set at that moment is displayed, and if the user wants to change the setting, an Edit button will be clicked at Step S1002. If the user clicks on the Edit button, a screen for setting the laptop mode is displayed at Step S1004.

If the laptop mode is disabled at Step S1006, all setting entries displayed on the window at Step S1014 are made unselectable, and it is determined whether there is any change in enable/disable at Step S1022. When it has been changed, the procedure goes to Step S1024 to make a storable button active. Then, after having stored the setting details in an appropriate memory that the PM driver controls, the procedure is ended at Step S1028. Meanwhile, if the setting is not changed at all at Step S1022, namely in the case of "no", the procedure goes to Step S1030, and the mode setting is ended without changing the setting at all.

Meanwhile, if the laptop mode is enabled at Step S1006, it is determined whether enabling/disable has been changed at Step S1008. If it has been changed, namely in the case of "yes", the storable button is made active at Step S1016 to store the setting details into an appropriate memory area that the power control driver controls at Step S1018, and then the procedure is ended. Further, even when the condition of enable/disable is not changed, it is determined at Step S1010 whether there is any change on the condition setting in the laptop mode. If there is no change, namely in the case of "no", the procedure goes to Step S1012 to complete the setting processing. Meanwhile, if it is determined that the setting has been changed at Step S1010, namely in the case of "yes", the storable button is set as active at Step S1020, the procedure goes to Step S1028 to store the setting details into an appropriate memory, and the processing is ended.

Figure 11:
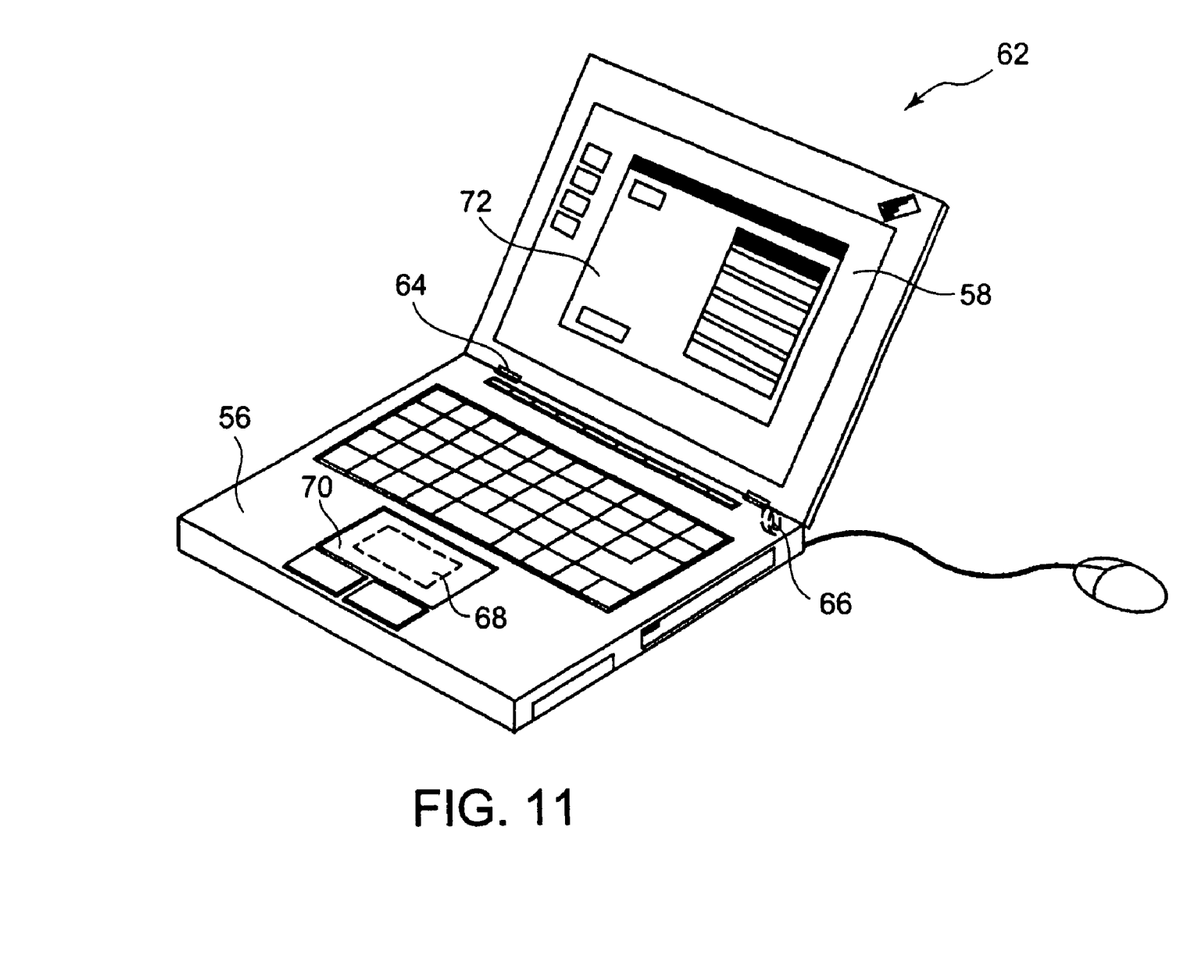
FIG. 11 is a view showing an embodiment of a notebook type of personal computer according to the present invention.

In FIG. 11, there are provided a description of an information processing apparatus as a specific embodiment of the present invention, and a description of an embodiment installed as a notebook type of personal computer 62. The notebook type of personal computer 62 includes the display unit 58 such as a liquid crystal display and the housing 56. A connector member 64 pivotally connects between the housing 56 and the display unit 58. An angle sensor 66 is attached close to the inside of a housing of the connector member 64, and a signal corresponding to an angle between the housing 56 and the display unit 58 is provided to the sensor driver 68 arranged at the lower portion of a touch-pad 70 as shown with broken lines so that the opening angle could always be monitored. The sensor driver 68 in the present invention could be installed as a module of the Embedded Controller 45. The user, if desiring the operation in the laptop mode, clicks on a power management icon from a start menu to display GUI 72 for the operation setting in the laptop mode, so that various kinds of settings can be made through the GUI 72.

Figure 12:
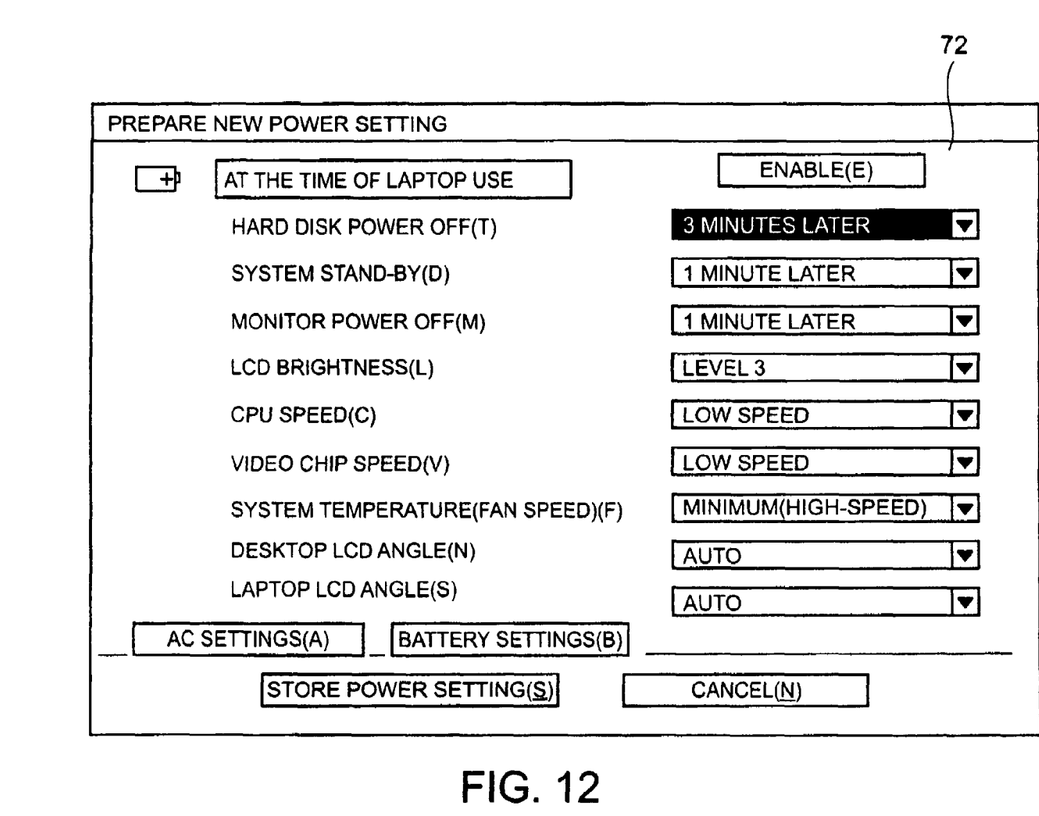
FIG. 12 is a view showing in detail a GUI for a laptop mode operation setting in accordance with an embodiment of the present invention.

FIG. 12 is a view showing in detail the GUI 72 for laptop mode operation setting shown in FIG. 11. The GUI for setting the laptop mode in the present invention is shown. In the laptop mode, as shown in FIG. 12, there is provided a description of a pull-down menu for inputting an LCD angle when the user uses the LCD on the desktop and for inputting an LCD angle when the user uses the LCD in the laptop mode in addition to a description of a power control pull-down menu such as the time until a power-off of a hard disk drive, the time until a system standby, monitor power-off, LCD brightness, CPU speed setting, video chip speed, and fan speed setting. After setting the mode operation as required, the user can automatically switch the operational mode from the previous operational mode to the laptop mode based on the value of the opening angle of the display unit, or the value of the opening angle and that of the acceleration sensor, by clicking on a setting button to register the settings.

The method according to the present invention described above can be described as a computer-executable program using object-oriented languages such as a machine language, an assembler language, C, C++, Java (registered trademark) or the like. Moreover, the program according to the present invention may be stored in a device-readable storage medium such as a flexible disk, CD-ROM, CD-RW, DVD-ROM, MO, magnetic disk or the like. Furthermore, the present invention is also similarly applicable to the portable information processing apparatus that uses a plasma display, an EL display or the like in addition to the liquid crystal display.

According to the embodiments of the present invention, it is possible to reduce the burden on the user who uses the information processing apparatus on the lap, by automatically switching the operational mode to a low power consumption mode, after determining in what state the user uses the information processing apparatus by using the opening angle between the display unit and the housing of the information processing apparatus, or the opening angle and the output value of the acceleration sensor. Therefore, it is possible to provide the information processing apparatus in which usability has been improved, the power management method, and the program for executing the above.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
   a display unit;
   a housing to which said display unit is pivotally attached;
   a central processing unit incorporated in said housing;
   an angle sensor which detects an opening angle between said display unit and said housing;
   a power management driver; and
   an angle comparison module which determines if the opening angle falls within a predetermined angular range corresponding to a laptop operational mode;
   wherein said power management driver reduces at least a clock rate of a central processing unit incorporated in the housing on condition that the opening angle falls within the predetermined angular range;
   wherein a power utilized and a heat generated by the central processing unit while operating the information processing apparatus in the laptop operational mode are decreased based on the opening angle falling within the predetermined angular range.

2. The apparatus according to claim 1, further comprising:
   an acceleration sensor;
   a memory for storing an output of said acceleration sensor over a predetermined period of time;
   wherein said power management driver reduces at least a clock rate of a central processing unit incorporated in the housing on condition that: the opening angle falls within the predetermined angular range and the output of the acceleration sensor is determined to be a non-zero value.

3. The apparatus according to claim 2, wherein said power management driver does not reduce at least a clock rate of a central processing unit incorporated in the housing on condition that: the opening angle does not fall within the laptop operational mode or the output of the acceleration sensor is determined not to be a non-zero value.

4. The apparatus according to claim 1, further comprising a graphical user interface that allows a user to increase or decrease the predetermined angular range.

5. The apparatus according to claim 1, wherein the power management driver controls:
   a head of a hard disk through a hard disk head unload driver; and
   reading/writing to the hard disk.

6. The apparatus according to claim 1, wherein the predetermined angular range comprises an opening angle of 145 degrees to 175 degrees.

7. A method comprising:
   detecting an opening angle between a display unit and a housing of an information processing apparatus, wherein the display unit is pivotally attached to the housing;
   comparing the opening angle with a predetermined angular range, the predetermined angular range corresponding to the information processing apparatus being used in a laptop operational mode; and
   reading a power management setting value specified by the opening angle if the opening angle is determined to be within the predetermined angular range; and
   changing an operational mode of the information processing apparatus to the laptop operational mode for reducing at least a clock rate of a central processing unit incorporated in the housing under a condition specified by the power management setting value;
   wherein a power utilized and a heat generated by the central processing unit while operating the information processing apparatus in the laptop operational mode are decreased based on the opening angle falling within the predetermined angular range.

8. The method according to claim 7 wherein the information processing includes an acceleration sensor, the method further comprising:
   storing an output from the acceleration sensor over a predetermined period of time; and
   reading an output of the acceleration sensor during the predetermined period of time;
   wherein said changing an operational mode of the information processing apparatus to the laptop operational mode is performed if the opening angle is determined to be within the predetermined angular range and the output value of the acceleration sensor is determined to be a non-zero value.

9. The method according to claim 8, wherein said changing an operational mode of the information processing apparatus to the laptop operational mode is not performed if the opening angle is not determined to be within the predetermined angular range or the output value of the acceleration sensor is not determined to be a non-zero value.

10. The method according to claim 7, wherein the laptop operational mode increases a rotation speed of a fan of the information processing apparatus relative to a rotation speed utilized in a desktop mode.

11. The method according to claim 7, further comprising:
    receiving a signal from a connector for docking; and
    upon receipt of the signal, preventing the information processing apparatus from entering the laptop operational mode irrespective of the opening angle.

12. The method according to claim 7, wherein the laptop operational mode reduces a video chip speed.

* * * * *